United States Patent
Jolitz

(10) Patent No.: US 6,768,992 B1
(45) Date of Patent: Jul. 27, 2004

(54) TERM ADDRESSABLE MEMORY OF AN ACCELERATOR SYSTEM AND METHOD

(76) Inventor: Lynne G. Jolitz, 22570 Citation Dr., Los Gatos, CA (US) 95033

( * ) Notice: Subject to any disclaimer, the term of this patent is extended or adjusted under 35 U.S.C. 154(b) by 332 days.

(21) Appl. No.: 09/756,667

(22) Filed: Jan. 8, 2001

Related U.S. Application Data

(63) Continuation-in-part of application No. 09/147,856, filed on Jul. 17, 1998, now Pat. No. 6,173,333.

(51) Int. Cl.[7] .............................................. G06F 7/00
(52) U.S. Cl. .............................. 707/6; 707/5; 709/236; 370/392
(58) Field of Search ............................... 707/1, 2, 3, 5, 707/6; 709/230–240; 370/389, 392

(56) References Cited

U.S. PATENT DOCUMENTS

| | | | | |
|---|---|---|---|---|
| 5,022,046 A | * | 6/1991 | Morrow, Jr. ................ 375/130 |
| 5,421,030 A | * | 5/1995 | Baran ......................... 725/106 |
| 5,916,305 A | * | 6/1999 | Sikdar et al. ................ 709/236 |
| 6,046,995 A | * | 4/2000 | Turnbull et al. ............ 370/389 |
| 6,088,356 A | * | 7/2000 | Hendel et al. .............. 370/392 |
| 6,173,333 B1 | * | 1/2001 | Jolitz et al. ................. 709/240 |
| 6,223,172 B1 | * | 4/2001 | Hunter et al. ................. 707/3 |
| 6,278,289 B1 | * | 8/2001 | Guccione et al. ............ 326/40 |
| 6,304,903 B1 | * | 10/2001 | Ward .......................... 709/224 |
| 6,321,269 B1 | * | 11/2001 | Walker ....................... 709/237 |
| 6,430,527 B1 | * | 8/2002 | Waters et al. ................. 703/3 |
| 6,484,170 B2 | * | 11/2002 | Abdat ........................... 707/6 |
| 6,510,509 B1 | * | 1/2003 | Chopra et al. .............. 712/13 |
| 6,526,066 B1 | * | 2/2003 | Weaver ...................... 370/465 |
| 6,549,519 B1 | * | 4/2003 | Michels et al. ............ 370/238 |
| 6,564,214 B1 | * | 5/2003 | Bhide ........................... 707/6 |

* cited by examiner

Primary Examiner—Safet Metjahic
Assistant Examiner—Brian Goddard
(74) Attorney, Agent, or Firm—Harold D. Messner

(57) ABSTRACT

An improved term addressable memory of an accelerator system and method includes a mechanism for performing predetermined plurality of pattern matches of packets to classify them for use with stateful protocol processing units that can resolve session data spread across multiple data packets and process them for the ultimate destination. The invention replaces a conventional content addressable memory with a term addressable memory, whereby redundant terms are recorded with a single memory entry. Two classes of terms are used to match packet addresses and application ports, as well as a much smaller session CAM that matches the aggregate match of all terms to a specific session.

6 Claims, 9 Drawing Sheets

FIG. 7

IP CAM size (in bits) PRIOR ART 97 bit            128 entries  12,416 total bits required

FIG. 8

VxCAM using term method and system of the invention

| | | | |
|---|---|---|---|
| addr | 32 bit | 16 entries | 512 bits |
| port | 16 bit | 64 entries | 1,024 bits |
| session | 8 bit | 128 entries | 1,024 bits |
| | | | 2,560 total bits required |

TERM ADDRESSABLE MEMORY OF AN ACCELERATOR SYSTEM AND METHOD

RELATED APPLICATION

This is an continuation-in-part of Ser. No. 09/147,856 filed Jul. 17, 1998 for "TCP/IP NETWORK ACCELERATOR SYSTEM AND METHOD WHICH IDENTIFIES CLASSES OF PACKET TRAFFIC FOR PREDICTABLE PROTOCOLS", WILLIAM F. JOLITZ, MATTHEW TODD LAWSON and LYNNE G. JOLITZ, now U.S. Pat. No. 6,173,333.

SCOPE OF THE INVENTION

In the above-identified application, there is described and claimed a network accelerator and method for TCP/IP that includes programmable logic for performing network protocol processing at network signaling rates. The programmable logic is configured in a parallel pipelined aarchitecture controlled by state machines and implements processing for predictable patterns of the majority of transmissions. In more detail, incoming packets are compared with patterns corresponding to classes of transmissions which are stored in a content addressable memory and are simultaneously stored in a dual port, dual bank application memory. The patterns are used to determine sessions to which an incoming IP datagram belongs, and data packets stored in the application memory are processed by the programmable logic. Processing of packet headers is performed in parallel and during memory transfer without the necessity of conventional store and forward techniques resulting in a substantial reduction in latency. Packets which constitute exceptions or which have checksum or other errors are processed in software.

It has now been discovered that the above-described and claimed accelerator and method has surprising improvement using an improved content or term adressable memory called "VxCAM or VIRTUAL EXTENSIBLE CONTENT ADDRESSABLE MEMORY". In accordance with the invention, VxCAM matches the minimum number of predetermined plurality of patterns resulting in fewer memory elements so that the invention can be easily implemented on-chip, narrows path width and reduces connection establishment overhead.

The present invention relates to Internet communications in general, and to a method and system in particular for substantially increasing the data throughput of TCP/IP protocol based data transmissions by selectively implementing in hardware certain portions of the TCP/IP protocol set (such as a majority of actually called and executed routines), and implementing in software routines the exceptions and remaining portions.

Since the implementation of FDDI fiber network links, the transmission speed of the physical layer to transmit data, has exceeded the ability of the end node computers to process the data packets. If the processing of the data packets is done by Von Neuman architectured end node computers, capacity is always exceeded since the switching speed of the fastest computer's gates will be approximately equal to that of the physical layer comprising the internal components of Application Specific Integrated Circuit (ASIC) chips. The computer CPU (which must process the data packets with multiple operations and copies to memory) intrinsically requires orders of magnitude more device operations than that of the analog/state machine mediated physical layer of the ASIC chips normalized to a common amount of data. While the problem of scaling current computer networks to gigabit speeds has been recognized, the complexity of the TCP/IP protocols has presented both practical and conceptual barriers to attempts to implement them in any manner other than various forms of software executed processes. However, even the fastest of CPUs for any given technological generation, cannot match the physical bandwidth of their internal components.

There have been a number of attempts to accelerate TCP/IP protocol handling, but none has effectively solved the latency problems. One approach to accelerate TCP/IP protocol handling was to process the headers of the protocols independently of the data payload. While the implementation of the protocols themselves was virtually identical to existing methods (TCP/IP software stack), the data was indirectly manipulated by separate buffering to avoid multiple copies of the payload data through the use of hardware buffer management using a multi-port memory. This approach demonstrated that hardware buffer management could improve handling of large payload packets, but it did not reduce packet latency to memory, did not improve the control bandwidth of the protocol or the ability to send small packets efficiently, and did not decouple protocol processing speed from transmission speed. The approach also was not applicable to local clusters, or to small record applications like web-serving or transaction processing. Moreover, the approach did not eliminate the store/forward processing of protocols, but merely attempted to optimize the methods by which the store and forward were mediated.

ATM cell-based transmission technology incurs a cost because of segmentation and reassembly of large data payload messages into much smaller cells. Devices which attempt to minimize this cost perform this function at the signaling rate. However, this function is specific to cell-based technologies, and is not particularly useful for technologies such as Ethernet and HiPPI. The payload size of such technologies' packets do not require an adaptation layer below that of the network or EP (Internet Protocol) layer. In order to process TCP/IP protocols, traditional store and forward methods must be used.

Protocol engines have also been used to optimize traditional methods of protocol handling to reduce certain steps. These include hardware checksum units, hardware buffer management, and RISC processing to improve protocol handling rate. However, this approach still does not scale with signaling rate.

Other approaches have implemented in hardware proprietary non-TCP/IP protocols having a continuous flow and routing that is specific to the particular network fabric. Variable context matching is not performed, and cells propagate in strict format and order to a priori known memory addresses instead of to a transport protocol's abstract port destination. Therefore, such approaches are not readily adaptable to wide area networks which must handle a variable and relatively unstructured traffic flow, and which must be scaleable, expandable and readily adaptable to network changes.

It is desirable to provide a network accelerator system and method for handling standard TCP/IP protocol which solves the latency and other problems of known systems and methods, and it is to these ends that the present invention is directed.

SUMMARY OF THE INVENTION

The present invention provides a solution to the above-mentioned protocol processing problems using a cross disciplinary combination of hardware elements, techniques and results based, inter alia, on network traffic analysis, high speed programmable logic array technology, and integration with low level operating system software design.

The invention solves a problem that has been long unsolved of how to process TCP/IP data packets at a speed equal to that made possible by the latest generation physical layer hardware transmission components. As microprocessors increase in speed, the same technology advances also increase the speed at which data can be transmitted over networks. If this data protocol handling must be handled in software, then there are fundamental issues in logic and software design that will always make the ability of a processor to process the packets slower than the physical ability of the network to transmit packets. This speed differential can penalize maximum possible network performance by a factor of almost one hundred at present.

The main insights that enable the invention to provide a practical and implementable solution to the above-mentioned protocol processing problems are the recognition that the transmission patterns of the vast majority of packets over current TCP/IP mediated networks are predictable and involve only a very small subset of the entire TCP/IP protocol set. It is possible through logic design to implement this small set of actually used protocols in hardware, such as programmable logic gate arrays, to allow processing of TCP/IP data packets at speeds equal to that of the ability of the fastest physical network layer. The rare packets that cannot be handled in this manner can be defaulted to conventional software processing. An operating system also can be low-level interfaced to this processing system through appropriate memory management in such a way that the packet's data coming off the network data transmission medium can be processed and put into application memory at the speed equivalent to a single gate-mediated operation.

The invention allows practical processing of TCP/IP data packets in gate array hardware at a data throughput equal to that of the physical transmission media. It accomplishes this task by recognizing that TCP/IP packets on current networks fall into predictable transmission patterns that actually utilize only a small fraction of the entire protocol for the vast majority of transmissions. By implementing this small subset in gate array hardware and defaulting the exceptions into software, a very large increase in TCP/IP packet throughput can be obtained.

TCP/IP transmissions handled by the invention can be made faster than that possible with the best current software implementations and multiprocessor TCP/IP processing engines. Using mask programmable logic affords approaches which are both faster and less expensive to construct than the current RISC CPU assisted TCP/IP processing boards, the invention is intrinsically scaleable upwards in speed with little or no-redesign needed as advances in IC processing technology makes the network physical layers faster. A form of software embedded in hardware which can be physically implemented at any point where TCP/IP packet processing is used such as in network interface cards, and within microprocessor CPUs, affording significant potential technological and economic benefits.

A difference between the invention and prior approaches is that the invention constructs a path into memory for a specific class of packets that exists for the likely time interval when such a packet will be present. The path into and out of memory is handled entirely in the hardware of the invention with only random logic up to where it interacts with the application, and is triggered entirely by the arrival of the packet itself. In this hardware, all details are present for handling the packet payload state to where it will be delivered. With accelerators on both ends of a network transfer, no software overhead need be present for bulk data transfer in burst mode. This differs markedly from prior software and hardware approaches which employed techniques of minimized protocol implementations, buffer management, or by spreading the protocol implementation across a specially designed network fabric.

The invention implements continuous flow (streamed) information delivery via a standard protocol such as (TCP/IP) by means of a pattern match via associative memory. It has several benefits in processing standard protocols, as opposed to non-standard protocols. These include absolute minimum latency between application and network medium (fibre), absolute maximum bandwidth between communicating network applications, low complexity design network protocol processing mechanism, and the protocol rate scales linearly with network signaling rate.

These and other benefits are obtained, in one aspect, by avoiding software and hardware processing steps via an isochronous "stimulus/response" architecture using a variable content addressable memory that has preprogrammed state logic that effects protocol processing as a minimum time series of operations. A substantial, e.g., ten-fold, improvement in interapplication bandwidth with same complexity hardware results which makes practical low-cost gigabit network transport communications. While standard protocol processing is not unique as a process, this inventive method of processing is unique in that the software of a protocol implementation processes protocol information indirectly via hardware which has been a priori instructed on how to handle a predicted flow of packets autonomously. This methodology is superior to prior attempts in that the transmission speed of the network transport layer is scaled with the network physical layer.

BRIEF DESCRIPTION OF THE DRAWINGS

FIGS. 7 and 8 are diagrams contrasting a traditional memory process with that of the invention and FIG. 9 is a diagram of the term addressable memory of the invention.

DESCRIPTION OF PREFERRED EMBODIMENTS

Figure 1:
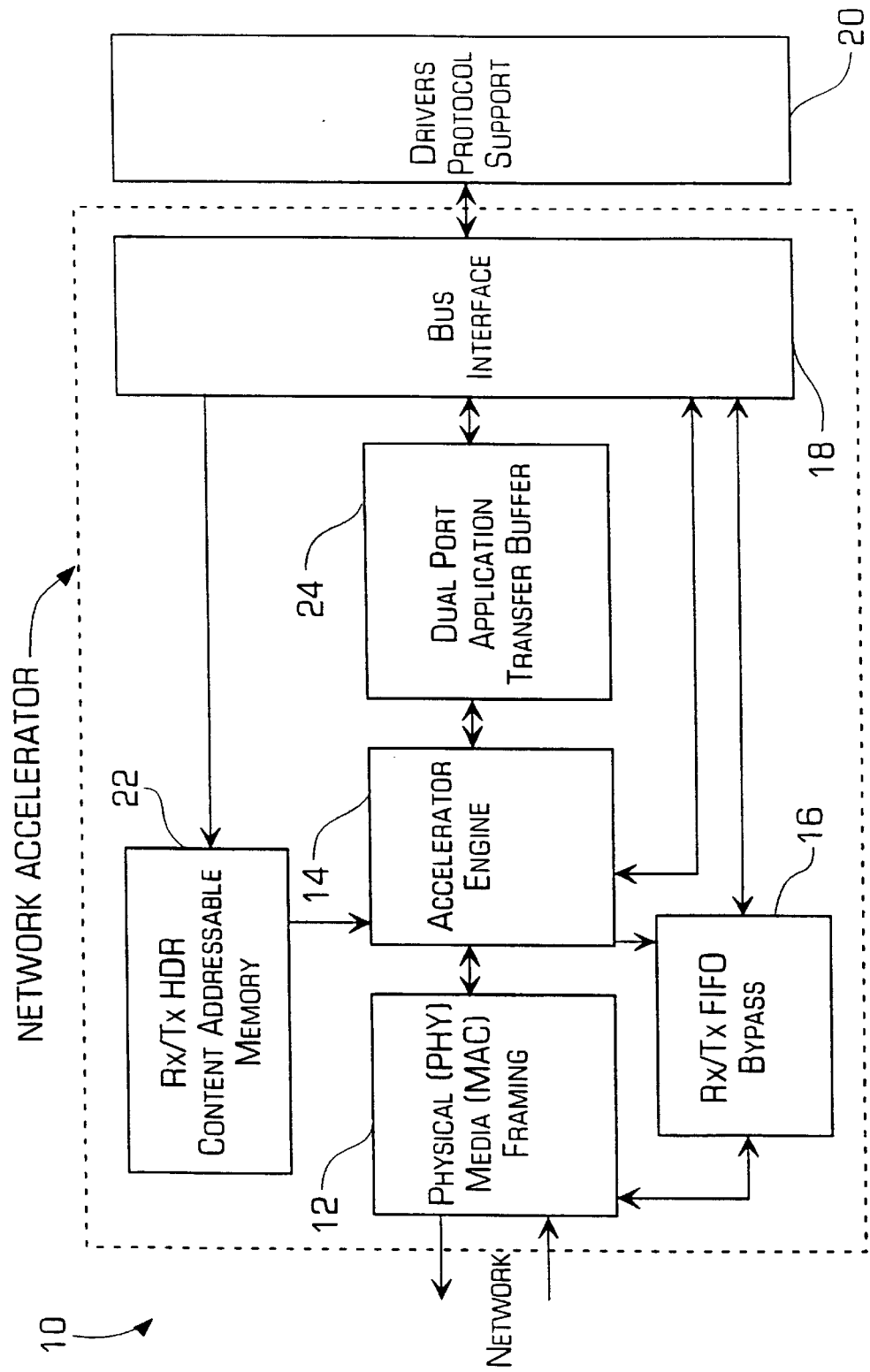
FIG. 1 is a diagram of a network accelerator in accordance with the invention.

The invention is particularly adaptable to TCP/IP protocols and will be described in that context. It will be appreciated, however, that the invention has greater utility and is applicable to other streamed protocols.

Computer networks use network software protocols to communicate information reliably between computers over multiple successive physical signaling mediums. These protocols are implemented in software on computer processors. While hardware signaling rates have steadily increased, software protocol processing has not kept pace. With the advent of gigabit networking technology, costly processors must be dedicated to providing at most 40–50 percent of the theoretical bandwidth of the network, while software implementations used with earlier signaling technologies were capable of 60–80 percent of theoretical bandwidth. Clearly bandwidth demands will continue to increase, and since the disparity between software protocol processing and signaling rates will also increase, this defines a "bottleneck" in the effectiveness of networking technology.

The invention affords a minimum time mechanism for handling TCP "burst" transfers. A burst transfer is a series of bulk data transfers with no options between nodes (usually it is unidirectional). It consists of the sending node passing data payload packets with successive sequence numbers, and the receiver committing them to memory and sending acknowledgments back to the sender to trigger more data to be sent. The invention efficiently handles the burst so as to minimize latency. The software triggers the burst mode by a traditional send operation with a full-payload, and the receiver/transmitter fall into an asynchronous feedback loop of "send-next"/"acknowledgment" packets that continues until either the burst completes or an error occurs.

The invention provides a mechanism to process the costly portions of standard protocols in hardware entirely, and to do so at the same clock rate of the signaling. In this way, as the signaling rate rises, so does the protocol processing rate increase in lockstep. This approach is based upon several observations, including traffic pattern analysis of packets, experience with software protocol implementations, and experience with other non-standard hardware-implemented protocols.

Traffic observation of TCP/IP packets shows that the majority of the packets simply pass bulk data without event, while the minority packets require more elaborate handling. Even more significant is that the delays on the Internet are for these very bulk data packets, so that it is critical to have timely delivery or low-latency of these packets for the performance to be maximized. Loss of this low-latency also impacts the reliability of a network, since it becomes impossible to tell if a failure has occurred, or if an assemblage of worst-case delays has masked an otherwise successful transfer. The ability to handle protocol packets with deterministic response time (as well as with a broad range of arrival distributions) is a requirement to maintain the "real time" characteristics that telecommunications services like telephone systems use to provide high-valued services en masse globally.

Experiences with software protocol implementations have shown that the necessary operations for a TCP/IP "burst" mode are constrained enough to be performed by hardware as clocked by the data stream. Unfortunately the difficulty in synchronizing the software with the data stream renders this observation useless. However, significant performance advantage can be gained by relying on hardware logic gate delays instead of program instructions for substantially reducing the latency between the network and application, thus allowing protocol handling at sustained rates without the need for additional buffering. This allows for continuous protocol processing at the data rate of the signaling technology. As will be described, the network accelerator of the invention uses a deterministic state machine to implement the transport protocol bulk receive and transmit functions, leaving to the software all other features of the protocol (including error recovery).

FIG. 1 is a functional diagram of a network protocol accelerator 10 in accordance with the invention. As will be described, the network accelerator can perform 100baseTx full-duplex interface to an Ethernet network, with media access controller (MAC functions), IP (Internet Protocol) processing and decoding, and TCP (Transmission Control Protocol) processing. It may be a PCI interface board, designed to be used in an NT workstation, for example, utilizing a standard PCI bus slot. The accelerator will preferably have a physical link layer processor, an IP processor, a TCP processor, segment buffer memory, multiple FPGAs for logic, and a PCI interface to the host system.

As shown in the figure, the network accelerator includes a network interface 12 that includes a physical (PHY) media framing unit which obtains physical signals from the physical media, decodes the signals and the link layer framing as a byte stream, and supplies the stream to an accelerator engine 14. Simultaneously, a copy of the signals may be recorded in a receive/transmit (Rx/Tx) FIFO bypass unit 16. In the event of a failure of the accelerator engine 14 to accept the packet, a system bus interface unit 18 may signal a system interface unit 20 to handle the packet which is stored in the Rx FIFO bypass portion of 16. Similarly, the system interface can send packets via the bus interface to the Rx/Tx FIFO bypass portion of unit 16, which hands it on to the physical media framing unit 12, effectively bypassing the accelerator engine for non-TCP data transfers. The accelerator engine 14 is connected to a variable content addressable memory 22, and consults the memory as octets of a packet are received to find a match with predetermined patterns. When a match is found, a state machine associated with the pattern is loaded from the content addressable memory into the accelerator engine to operate on the packet. Operations may include packet table delivery from the physical media framing unit to a dual port application transfer buffer 24; sending a packet with payload from the application transfer buffer to the physical media framing unit; and sending a packet acknowledgment to the physical media framing unit.

Upon completion of an operation, the accelerator engine 14 may signal its status to the system interface unit 20 via the bus interface 18 indicating the event. In the event the accelerator engine fails to recognize a packet or encounters an error, such as a CRC (cyclic redundancy check) or checksum error, the accelerator engine suspends operation on that segment causing all packet traffic to be handled via the Rx/Tx FIFO bypass buffer until it is re-enabled by the system interface unit 20 via the bus interface 18 to return to normal operation.

Preferably, the network accelerator of the invention is implemented as a set of programmable logic chips intermediate between the network physical layer interface chip set and an interface chip set for the PCI or other bus. These programmable logic chips may be SRAM field programmable gate arrays (FPGAs) which can be reprogrammed via the network to allow the hardware protocols to be modified after installation to correct errors, to optimize performance as the network changes, or to implement changes to existing protocol sets. Low cost implementations can also use mask programmable chip sets. The speed advantages of mask programmable ASICs may make their use preferable in high speed point to point data transfer applications where the end nodes and routers are well defined by the user.

The network accelerator also may be implemented within the silicon of the main microprocessor or within on-board multi-chip-modules analogous to the way MMX incorporates digital signal processor functionality, or by which AGP provides on-chip integration of graphics accelerator functions. This can bring the data directly into the microprocessor, bypassing the external data bus interface which otherwise limits performance.

The high speed data transmission capability of the invention is advantageous in providing for direct data storage, display, or data processing device interconnect both between and within individual computers.

Figure 2A:
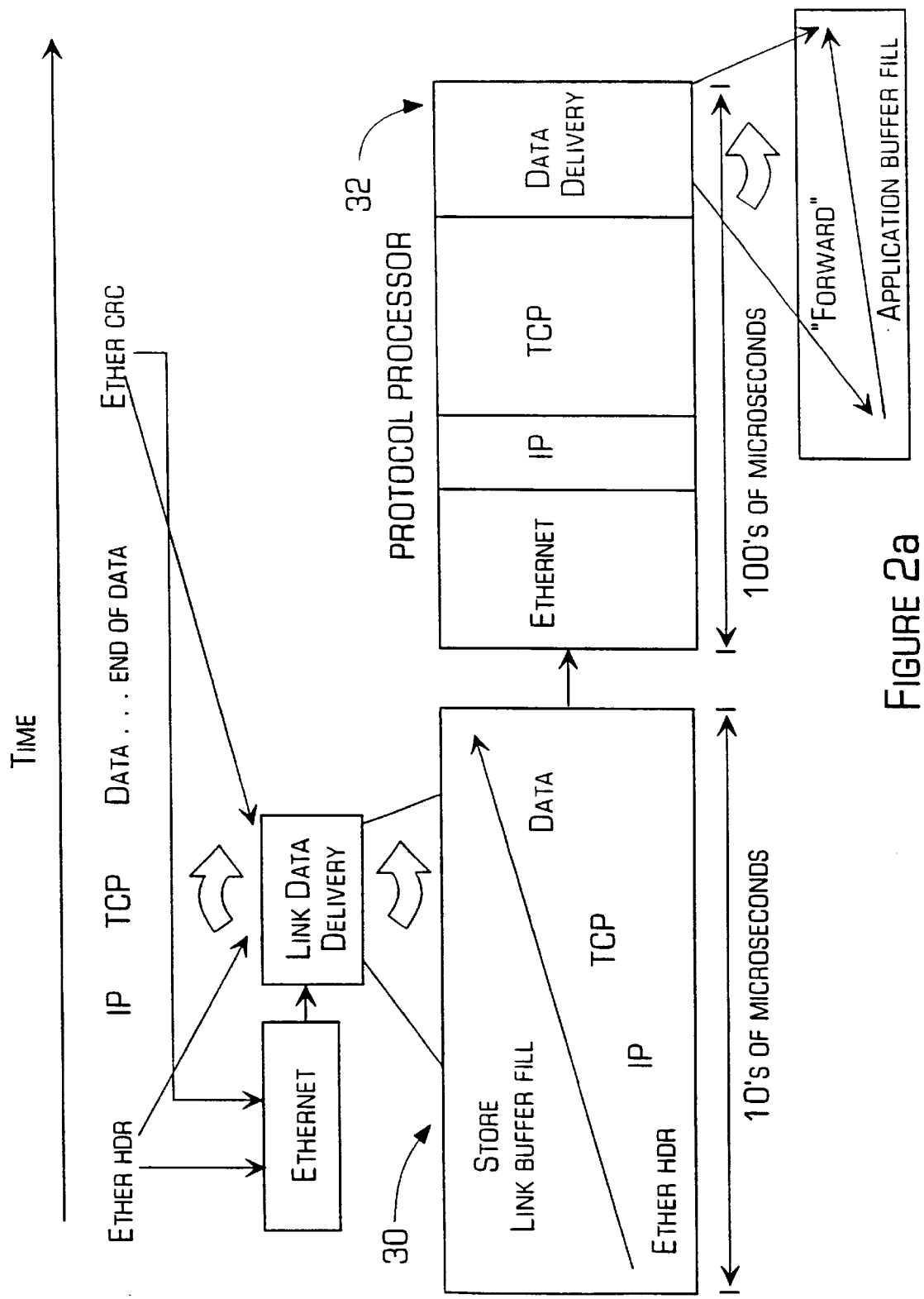
FIGS. 2a and 2b are diagrammatic views which contrast, respectively, a traditional link data stream store and forward approach with a network accelerated continuous flow link data stream approach in accordance with the invention.
Figure 2B:
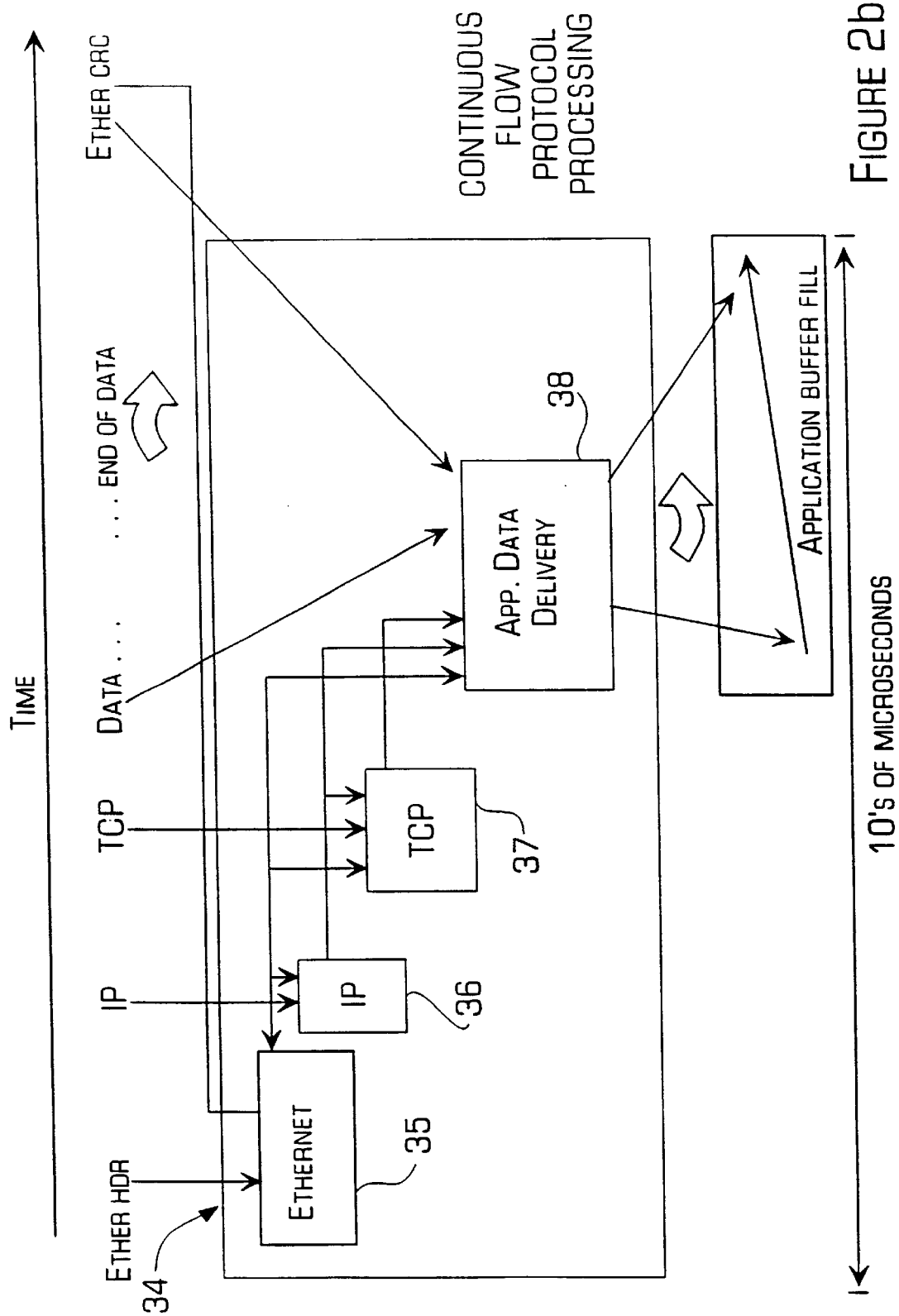

FIGS. 2a and 2b are diagrammatic views which contrast the significant improvement in latency between a network accelerated continuous flow link data stream approach of the invention (FIG. 2b) and a traditional link data stream store and forward approach (FIG. 2a). FIG. 2 illustrates how a traditional protocol stack accumulates data in a store and forward buffer 30, and then performs the necessary protocol processing operations. As indicated in the figure, data packets from an Ethernet are delivered to a link data delivery unit which may perform error checking prior to storing in buffer 30. The time required for this operation is of the order of tens of microseconds. Subsequently, the various segments of the data packet are processed in a protocol processor 32. This processing is sequential, and results may also be placed in the store and forward buffer as application payload data is delivered to the protocol processor. This typically may take hundreds of microseconds, even with very high speed devices performing the operations. The critical weakness is that data must be in some kind of buffer before it can be processed, and processing must be completed before the data can be forwarded.

In contrast, as shown in FIG. 2b; the network accelerator of the invention uses the protocol's data stream itself as a way of instructing a uniquely constructed data flow processing machine 34 that is clocked by the protocol data and which performs processing operations as the information appears. As indicated in the figure, processing occurs in a series of parallel functional units 35–38 having a pipelined architecture so that packets are processed in real time with the processed data flowing between the network's wire link and the processing application's data origin. In effect, a protocol's packet would appear as a single, fat instruction that would run on a data flow processor in lock step with the link's data rate. This allows complete processing in times of the order of tens of microseconds in contrast to the traditional store and forward approach illustrated in FIG. 2a. The manner in which this is accomplished will be described in more detail below.

Figure 3:
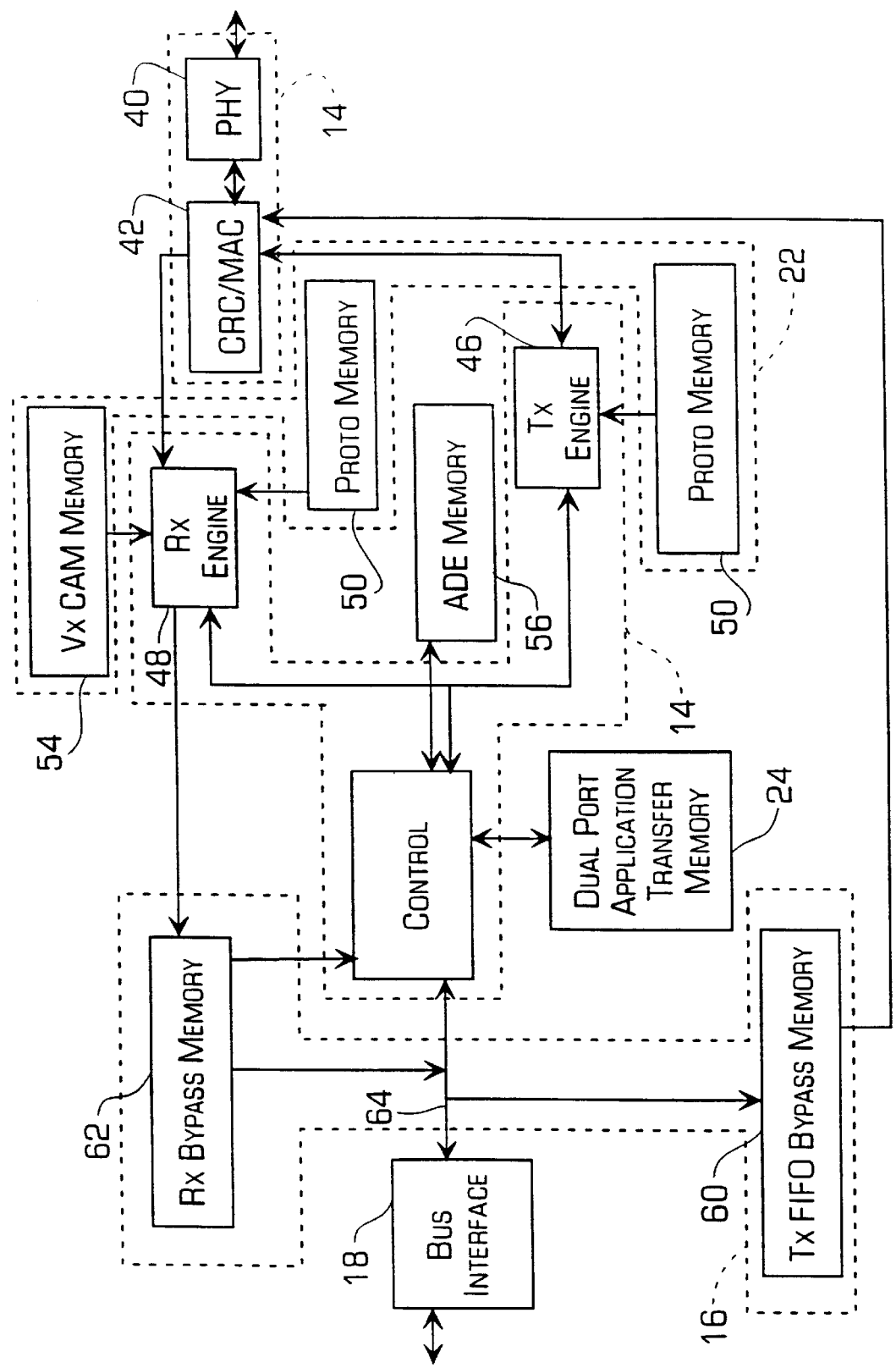
FIG. 3 is a more detailed diagram of the network accelerator of FIG. 1.

FIG. 3 is a functional diagram which illustrates in more detail a preferred embodiment of the network accelerator of FIG. 1. As shown, the physical media framing network interface 12 may comprise a physical device interface (PHY) 40 connected to a CRC/MAC unit 42. This physical device interface and CRC/MAC unit provide physical and link layer access, respectively, to an Ethernet network. The CRC/MAC unit provides parallel-to-serial conversion, CRC (cyclic redundancy check) generation and checking, MAC address recognition, FIFO buffering, and interface to the remainder of the network accelerator, which includes TCP/IP processors and the dual port application transfer memory 24, which preferably comprises a dual port/double banked RAM.

As will be described more fully, outgoing Ethernet packets will be read from the buffer memory 24 and transferred to an internal FIFO in preparation for transmission to the network. As the Ethernet packet is constructed and output to the network from the FIFO by the Tx engine, the CRC will be calculated on the fly and appended to the end of the Ethernet packet. An incoming Ethernet packet is stored in the incoming FIFO while the destination address is checked against the MAC address register. If the MAC address is correct, the Ethernet packet is sent to an Rx engine. The Ethernet packet is also run through the CRC checker, simultaneously. Once the Ethernet packet is completely received and the CRC is good, the CRC good signal will be asserted.

As shown in FIG. 3, the accelerator engine 14 includes a control unit 44, a Tx engine 46, and a Rx engine 48. Included within the variable content addressable memory 22 is a first prototype memory 50 connected to the Tx engine 46, and a second prototype memory 52 connected to the Rx engine 48. In addition, variable content addressable memory (VxCAM) 22 includes a content addressable memory (CAM) 54 which is also connected to the Rx engine 48. The variable content addressable memory matches a variety of packet formats and is used to quickly determine to which session an incoming IP datagram belongs. The variable content addressable memory 22 also includes an ADE memory 56 which is connected to control unit 44. The Rx/Tx FIFO bypass memory 16 may be implemented as a Tx bypass memory 60 and a Rx bypass memory 62. As shown, bypass memory 62 may be connected to the Rx engine 48 and to a bus 64 connecting the control unit 44 and bus interface unit 18. The Tx bypass memory 60 may be similarly connected to bus 64 and to the CRC/MAC unit 42.

The network accelerator handles the various layers of an Ethernet packet as it is sent or received from a network. When processing the IP layer, the IP address, IP checksums, ID field, flags, IP datagram length, etc. are either pre-calculated and sent to the network via the Tx engine 46, or used to verify the destination of an incoming Ethernet packet via the Rx engine 48.

When processing the TCP layer, TCP ports, TCP checksums, sequence numbers, ACK number, flags, window size, urgent pointer, options, etc. are either pre-calculated and sent to the network via the Tx engine, or used to verify the destination of a incoming IP datagram via the Rx engine. The Tx engine 46 obtains the TCP payload directly from the memory 24. The Rx engine 48 delivers the TCP payload directly to the memory 24.

The memory 24 will contain the host system view of network memory, and a shadowed copy for the network accelerator to use for TCP segment transmission and reception. The host system software driver will swap application memory (system RAM) for memory 24. This will allow the host system direct access the network data stored in the dual-port/double banked memory, effectively replacing the role of host system RAM. Finally, the system interface controls the relationship between the system and the network accelerator. It contains configuration and status registers, and allows the host system to access the network accelerator.

Data for the packets are buffered for transfer using the memory 24. This memory maintains an up-to-date copy of the network data for the host system/application, and a local copy of the network data for the network accelerator. This allows the application/host system to access memory as it would system RAM before, during and after a TCP segment is sent to the network by the network accelerator. Also, the memory allows access to a stable copy of the network data for transmission or reception to/from the network. The network acceleration control unit maintains the proper relationship between the memory banks, with the banks synchronized in the case of Idle state (the network accelerator is neither transmitting nor receiving TCP segments), or logically separated during network accelerator TCP segment transmission or reception. The double banked nature of the memory allows a "zero-copy" or "zero-latency" method of network data delivery to the network accelerator.

Along with the bulk memory, there is status memory used to maintain the relationship between the memory bank and the host system memory bank. This status memory works as a table indicating which bank of memory has the most current byte of network data for each address in the memory.

The content addressable memory (CAM) 54 is used to quickly determine to which session an incoming IP datagram belongs. It cooperates with ADE memory 56, prototype memories 50, 52, and is part of the variable content addressable memory (VxCAM) 22.

Within the ADE memory 56, there will be one or more address descriptor entries (ADEs) which describe the segment details such as memory base address, TCP payload length, TCP payload checksum, next TCP sequence number and the next TCP segment's ADE. This information is used by the Tx engine when the segment is constructed, prior to transmission. The Rx engine uses the ADE fields to determine the sequence numbers, payload destination, and out-of-order segments.

Within the prototype memories 50, 52, there will be one or more session prototype description entries. These entries describe the session fields that do not change, as well as the initial values for the session, such as IP address, TCP ports, protocol fields, base sequence number, first ADE, etc. The Tx engine uses this information to generate the static fields within a session for an outgoing TCP segment. The Rx engine uses this information to determine what TCP session an incoming TCP segment is destined for, and to verify the validity of specific fields in the TCP/IP header.

The content addressable memory 22 stores the address of the potential TCP session prototype entry that describes the session to which an incoming segment belongs. Certain fields in the TCP/IP header are hashed to obtain a value which is used as an address to "look up" which prototype describes this segment. The memory stores at the "hashed" address another address which points to the prototype data in the prototype memory. If the memory returns a value of zero, the incoming TCP segment does not belong to any accelerated sessions and is routed to the bypass FIFO. In this manner, a "one shot" lookup of the TCP session prototype can be done, rather than searching potentially thousands of TCP session prototypes.

Figure 4:
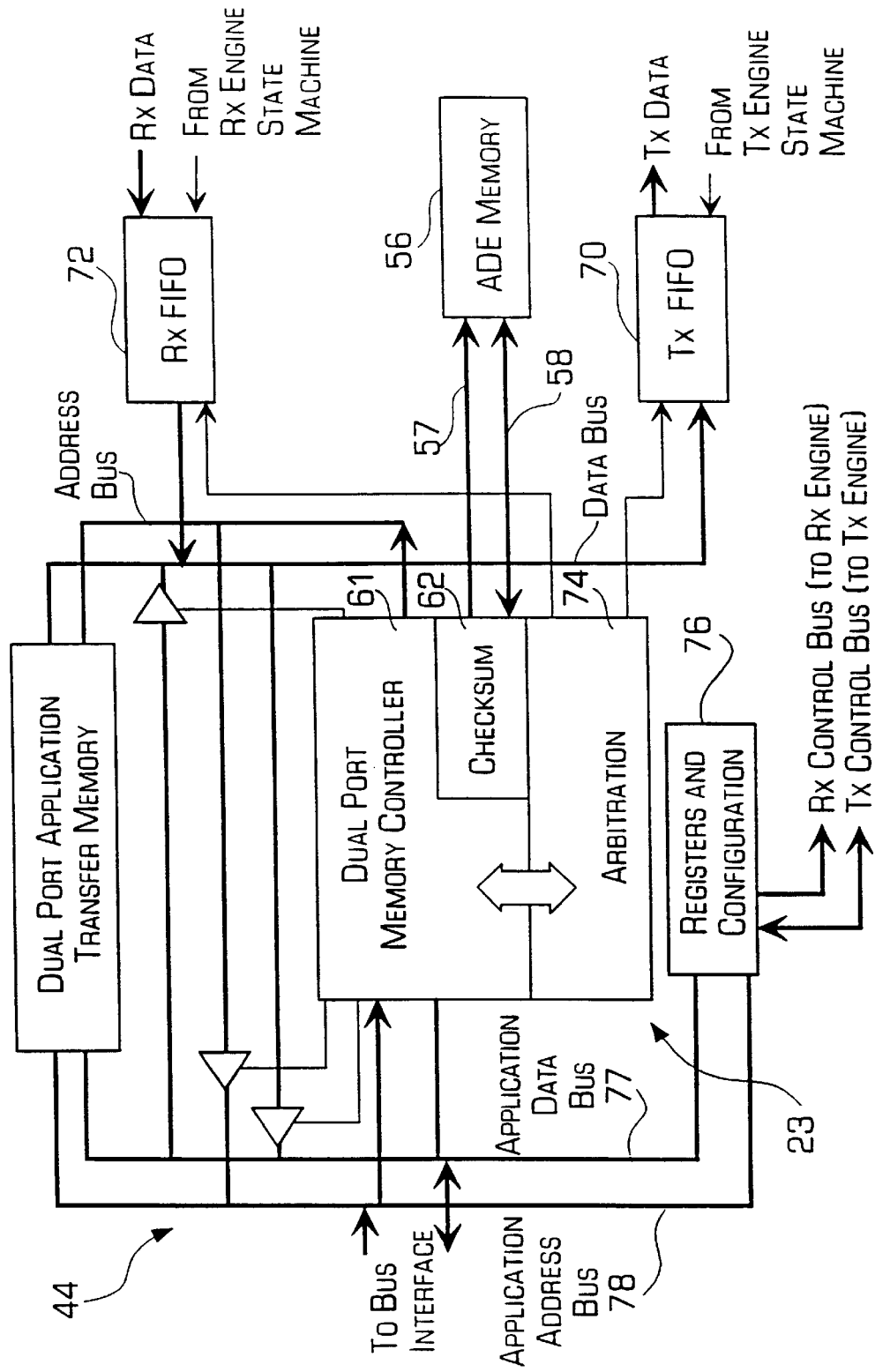
FIG. 4 is a diagram of a control unit of the accelerator of FIG. 3.

FIG. 4 illustrates the network accelerator control unit 44 in more detail. As indicated above, the control unit provides the overall state machines and control registers which control the network accelerator. Logic for controlling the dual port application transfer memory 24 and the Tx and Rx session state machines (to be described) for the Tx engine and the Rx engine, respectively, may be contained in a dual port memory controller 61. Logic for generating a checksum may be contained in a checksum unit 62 which interfaces with ADE memory 56 via an address bus 57 and a data bus 58. After initialization of a current checksum, the ADE memory 56 may be created and used for bounds checking on the host address to obtain the checksum for the desired payload of a TCP segment. This checksum may be loaded into the checksum unit 62. The current value may be stored in memory 24, and a new calculated value may be added to the checksum. The checksum may then be saved L either through a write back to the ADE memory 56 and the dual port application transfer memory 24, or if multiple locations require modifications, by iteration. The calculated checksum is then ready for use as the data checksum of the TCP segment.

As shown in FIG. 4, a first FIFO buffer 70 may interface the dual port application transfer memory 24 to Tx data from the Tx engine state machine, and a second FIFO buffer 72 may interface memory 24 to Rx data from the Rx engine state machine. Logic for controlling the FIFOs may be contained in the FIFO buffers themselves and used to minimize bus arbitration read/write by an arbitration unit 74. In addition, logic for controlling the Rx engine and the Tx engine, as well as access to their status and control registers, may be contained in a registers and configuration unit 76 which is interfaced to memory 24 and memory controller 61 by an application data bus 77 and an application address bus 78. Arbitration unit 74 also may include logic to control memory access arbitration between the host system and the network accelerator. The network accelerator control unit also maintains global control of the state machines for each session.

The Tx state machine and the Rx state machine may have the following states. Tx idle is the state prior to sending a Tx buffer to the network. This is the default state and is set up by the software driver. The software driver will also generate the necessary values for the VxCAM for a given buffer space. The host system fills the memory until the session is ready to be transmitted. At this point, the state machine transitions to the Tx pending state.

During the Tx pending state, the dual port memory controller 61 maintains two copies of the data: one for the host system, and one for the Tx engine. Proper data relationship between the host system memory and the network accelerator memory must be maintained to prevent old data from overwriting new host system data, and new host system data from overwriting the data in use by the Tx engine.

In the Tx complete state, if the transmission fails the state machine goes to the Tx retransmit. If the Tx was a success, the network accelerator will set a success bit and go to the Tx idle state. The network accelerator is now waiting to send out the next segment. In either case, the network accelerator control unit must continue to maintain the proper relationship between the two copies of data.

If the Tx transaction fails, in the Tx re-transmit state, the network accelerator may either attempt to re-transmit the segment, or move to the next session queued for transmission and attempt this segment later.

The Rx idle state is the initial state. In this state, the two copies of network data are reconciled. Depending on the outcome of the previous received segments, the host system reads data from either the shadow bank of dual port application transfer memory or the application bank of same memory. If a packet was successfully received, the net payload data stored in the shadow bank of the dual port application transfer memory must be presented to the host system. This is performed on a byte by byte level.

In the Rx pending state, the Rx engine is receiving one or more segments is the current session. Receive data is placed in the proper bank of the memory by the network accelerator control unit.

In the Rx complete state, there may be two different scenarios: Rx success or Rx time-out. In the case of success, the success bit for the ADE is set, then the Rx idle state is entered. In the case of failure, the state machine goes to idle and no changes occur to the memory.

Checksums for the payload of the TCP packet are calculated by the checksum logic 62 as follows. Upon initial setup of the session, the section of memory used by the session is cleared to all zeros. This allows the initial checksum to be initialized to zero for each segment. ADEs are setup for each segment within the session; ADEs contain the starting address, ending address, and checksum for each segment of the session. There may be one or more segments in any session.

During host system writes, the host system presents an address to be accessed. Bounds checking is performed on this address to determine which ADE contains the checksum for this address. The checksum is loaded into the checksum logic and the current (old) value in the memory is subtracted from the checksum. Next, the new data value is added to the checksum.

Upon saving a new checksum, if it is a single location write, the new checksum is written back into the ADE and the new data value is written into the memory. If multiple locations are to be modified, the checksum stays in the checksum generator and each new data value is added to the checksum while each old value is subtracted. The new data is written into the dual port application transfer memory 24 during this operation.

Once a segment is ready to be sent to the network, the Tx engine uses the checksum stored in the ADE as the checksum for the data portion of the TCP segment.

The Rx engine and the Tx engine use FIFOs 70, 72 for interfacing the engines to the dual port application transfer memory 24. The FIFOs minimize the bus arbitration necessary to read and write data into the dual port application transfer memory 24 from the engines. The control of the FIFOs involves filling and draining the FIFOs in a cycle-steal mode between host system accesses to the memory.

The control unit 44 has an address and data bus connection to the Tx and Rx engines 46, 48. This bus allows the control unit to set and read configuration and status registers within the two engines.

The control unit controls access to the Tx and Rx engines and all memory 24, 50, 52, 56, and CAM memory 54 through arbitration, using arbitration unit 74. Host system accesses and accesses compete for access through the control unit. Any known arbitration method may be used to control these accesses.

Figure 5:
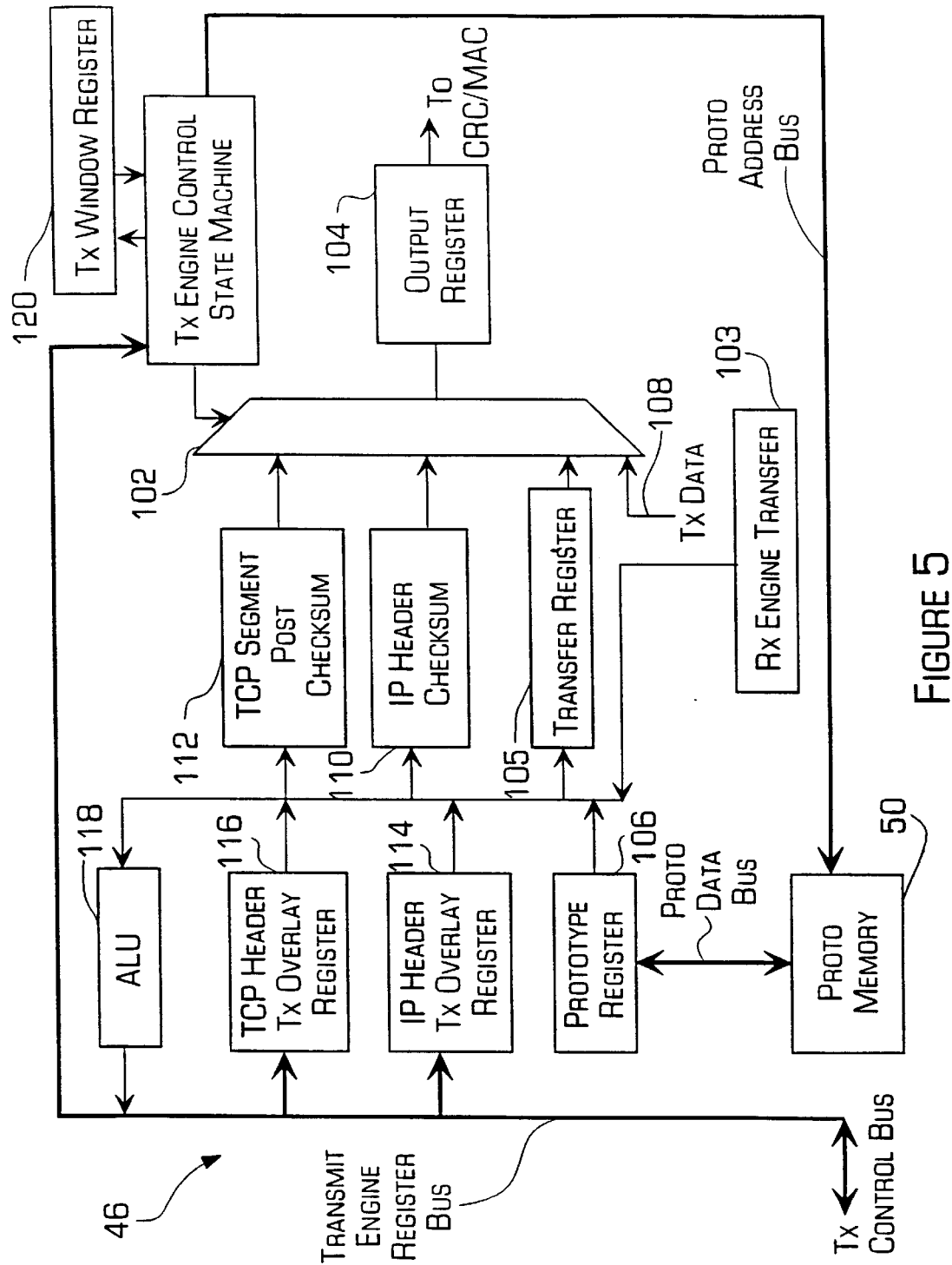
FIG. 5 is a diagram of a transmit engine of the network accelerator.
Figure 6:
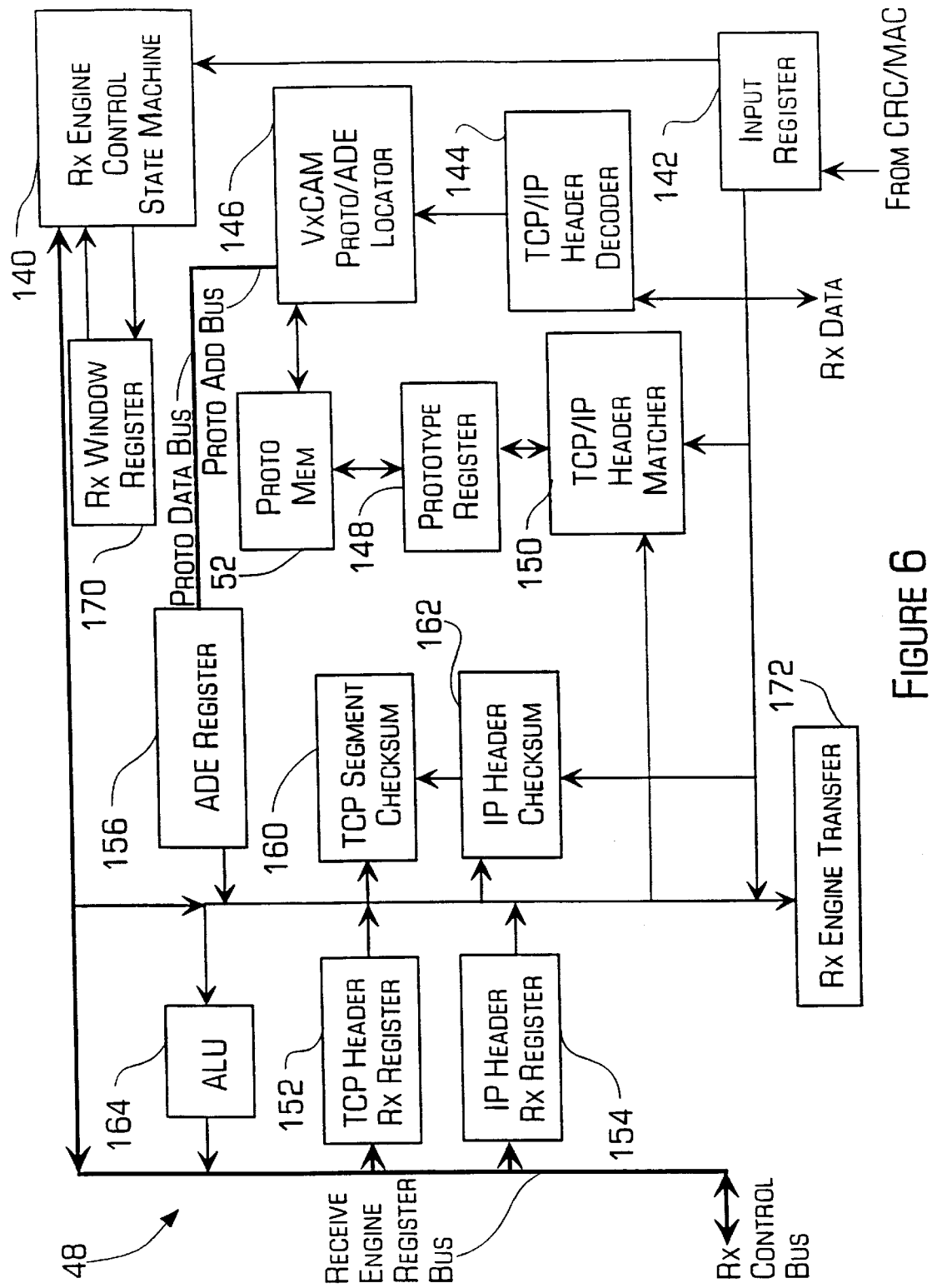
FIG. 6 is a diagram of a receive engine of the invention.

FIGS. 5 and 6, respectively, illustrate in more detail preferred embodiments of the Tx (transmit) engine 46 and Rx (receive) engine 48. Referring to FIG. 5, Tx engine 46 may be controlled by a state machine 100, which is used to generate signals which are used to control all the events in the send process. It may be based on a send counter (not shown). This counter is started at initial transmission time, and generates signals which are used to control all the events in the send process. A multiplexer 102 combines Tx data and the outputs of several registers, and provides these to an output register 104.

The registers muxed to the output register 104 may be Tx prototype register 106, a Tx application data output register 108, the outputs of checksum registers 110 and 112, an ACK register, and all the individually calculated fields in overlay registers 114 and 116.

The send counter and the Tx engine control state machine 100 govern the timeslots for outputting the various fields to the output register. The state machine determines the proper time to calculate the various IP and TCP fields and when to send next segment. Sliding window calculation logic provides the information via register 120 to the Tx engine state machine for next segment transmission.

The Tx engine is responsible for sending Ethernet packets containing IP datagrams of TCP segments to the network. There are two primary types of TCP segments. These are user data (ADE) segments, and automatically generated acknowledgment segments for received data. The network accelerator creates packets from scratch, generates the Ethernet header, the IP header, the TCP header, and the TCP data payload.

The Tx engine state machine 100, which may be contained in the dual port memory controller 61, asserts the Tx pending state through the Tx engine control state machine 100, making available data contained in the Tx FIFO 70 (FIG. 4). The Tx engine loads a prototype register 106 with static portions of the TCP/IP headers from the proto memory 50 of the Tx engine (FIG. 3). The logic for the calculation of the dynamic portion of TCP header is contained in a TCP header Tx overlay register 116. The logic for the final checksum calculation for the dynamic portion of the IP header may be contained in an IP header checksum register 110 of FIG. 5, and the logic for the post-checksum calculation for the TCP segment may be contained in a TCP segment post-checksum register 112. The logic which provides sequential accesses to the register contents to the output register 104 may be contained in a transfer register 105. The logic for calculating sequence numbers from the TCP header Tx overlay register by adding the length of the packet data contents to a current sequence number may be contained in an arithmetic logic unit (ALU) 118. The logic to obtain values of a prior received datagram's sequence number and length to generate an acknowledgment number using the ALU may be obtained from the Rx engine TCP header Rx register 103. The final results may be output via the output register 104 to the CRC/MAC unit 42 of FIG. 3. The logic for determining whether sending of a datagram was successful and acknowledged may be contained in the engine control state machine 100. The logic for determining if one can send additional datagrams is determined by the engine control state machine 100 and Tx window register 120.

The data used to generate the dynamic calculated portion of the TCP/IP headers reside in the ADE memory, the proto memory, and the memory 24, and the data to generate the static precalculated portion of the TCP/IP headers resides in the Tx engine proto memory 50. The data used to generate the TCP/IP payload resides in the dual port application memory 24.

When the host system asserts a signal indicating that a segment should be sent to the network, the base address of the segment prototype is loaded into the Tx engine proto memory address register, and the base ADE address for the segment is loaded into the Tx engine ADE memory address register. The Tx engine reads the ADE and prototype data out of the ADE memory and the Tx engine proto memory, respectively, then calculates the various fields and inserts the fields into the outgoing network stream. Certain fields of the stream, such as sequence numbers, ACK numbers, ID fields, etc., may be calculated as the stream progresses. Once the headers have been calculated, the TCP payload is output from the dual port application transfer memory. Finally, the CRC/MAC unit 42 appends a CRC 32 value to the Ethernet packet, and completes delivery of the packet to the PHY device 40. In this manner, the network accelerator generates a complete Ethernet packet comprising an IP datagram containing a TCP segment.

Referring to FIG. 6, the Rx engine 48 is controlled by an Rx engine control state machine 140, and receives Ethernet packets from the network interface comprising the PHY device 40 and the CRC/MAC unit 42 via the input register 142. Upon receipt, the state machine sequences data to other elements of the Rx engine. The receive packet is sent to the Rx bypass memory 62, which serves as a buffer and used for any packet that is not a bulk data transfer TCP segment. The Rx engine processes the IP and TCP headers and determines the type of TCP segment. The Vx CAM memory 22 is used by the Rx engine to determine to which session an incoming IP datagram belongs.

The Rx engine, under the control of state machine 140, compares a number of fields of the EP header with expected values stored in a plurality of registers. Certain fields in the TCP/IP header are static and can be compared against static values. Other fields are variable, and define, for example, the length, or checksum or other session-related details. The variable fields are compared against values stored in registers and pre-determined values stored in the ADE memory.

Upon receiving an incoming packet, the header is decoded by a decoder 144 to determine the location of the source and destination addresses and ports contained in the TCP/IP header. The logic for locating the associated prototype packet header and address descripted entry is contained a Vx CAM proto-ADE locator 146. The Rx engine block address decoded entry may be held in an ADE register 156. The Rx engine block prototype entry may be held in proto memory 52, which loads the entry into a prototype register 148. A TCP/IP header matcher 150 which contains logic for comparing of session fields of the packet obtained from the prototype register and variable fields held in a TCP header Rx register 152 and IP header Rx register 154. Logic for validating the checksum for the IP portion of the TCP/IP header matcher 150 may be contained in an IP header checksum unit 162, and the logic which validates the checksum for the TCP segment portion of the TCP/IP header matcher and the data stream from the input register 142 may be contained in a TCP segment header checksum unit 160. Data from valid packets may be passed to the receive data FIFO 72 (FIG. 4). Logic for updating TCP header Rx register 152 for transmitted data acknowledgments or buffer window size adjustment may be contained in the arithmetic logic unit (ALU) 164.

The Rx engine control state machine 140 reduces the Rx window register 170 as data is received, and increases it as buffer space becomes available in the dual port application transfer memory 24 (FIG. 3) by the application. Under the control of the state machine, the contents of the Rx window register 170 may also be passed to the ALU 164 to synthesize a window update, which may be passed to the Tx engine via the Rx engine transfer unit 172.

When processing a packet header, if any of the fields of the header do not match expected values, the segment may be routed to the Rx bypass memory 62, and the Rx engine may go into an idle state. The IP source and destination addresses, plus the TCP source and destination ports, may be hashed together to form a value which is used as an address to look up in the content addressable memory the address for the Rx prototype. If the memory returns a non-zero value, it is used as an address to fetch the Rx prototype. If the value is zero, the packet is routed to the bypass buffer.

The value returned by the content addressable memory is used as the base address for the Rx prototype for the segment. The prototype is read and the IP address and the TCP ports are compared against prototype values. If they match, the segment is accepted for further processing, and the ADE base address is read from the prototype memory array. The ADE contains the base sequence number of the memory region. If the sequence number and the segment falls within those in the ADE, it is accepted and the base TCP payload address is read from the ADE.

Data from the segment is read into the dual transport application memory 24 until the segment is completely received, which can be determined by a length counter. Once a segment is received, a CRC 32 signal may be asserted, indicating the packet has been verified and to notify the host system of receipt of data. The Rx engine 48 remains in a pending state until a finished bit is received for the segment. At that time, the system is interrupted and the network accelerator control unit goes into the Rx complete state.

From the foregoing, it may be seen that the network accelerator of the invention affords significant advantages, and may be used in diverse applications. It is also applicable to continuous flow, streamed protocols other than TCP/IP. Some of these applications include high speed links for network backbones, protocol processing for gigabit physical Ethernet layers, data transport between computers within a system, high speed transport for real time high resolution video, increasing the speed of Internet data burst communications, permitting telephony packets to be transmitted over the Internet, and affording enhanced transaction processing and robotics control feedback.

As will also be appreciated from the foregoing, the implementation of the network accelerator is not limited to FPGAs. It may be implemented in other forms of hardware, and even integrated with microprocessors. The invention may be installed in various components, such as disk drives, graphics cards, video transmission devices, wireless links, TCP/IP hubs, and the like. The substantial increase in speed and corresponding reduction in latency afforded by the invention is a significant advantage.

OVERVIEW

Internet communications require heavy use of packet traffic that is directed between endpoints by large (32 to 97 bit) identifiers within the packet, packet traffic is directed by partially decoding the full 97 bit identifier. The smallest identifier (32-bit) direct traffic to a computer, medium sized identifiers direct traffic to a specific computer's application program instantiation (65-bit), while the largest identifier (97-bit) identifies the communication session between two application programs. Level-3 switches use the smallest identifier, but for level-4 switches and processor adapters, medium and large identifiers are required, hundreds to thousands of these identifiers may be used in a fraction of a second. If more identifiers can be matched more quickly, the same hardware can handle more network bandwidth for improvement in performance.

Content-addressable memory (CAM) is a hardware concept commonly used in switches to direct packets. The VxCAM, or Virtual context dependant content addressable memory is an improvement of the CAM concept that takes into account characteristics of the usage on the Internet to perform more effectively. The VxCAM outperforms a CAM in a Level-4 device by requiring (a) fewer memory elements to switch the same amount of traffic, (b) less wide data paths, and (c) shorter connection establishment—all the result of the fewer terms to check and setup.

This invention reduces the complexity of the process of associating packets with specific information sessions or groups as explained above such that higher-level protocol functions can be performed. In accordance with the invention, since the primary protocol used to communication over the Internet is TCP, over 95% of all communications is TCP. A single web page on the average has 10 connection sessions that each send on the average 10K bytes of payload for a total of 100–300 packets. The 97 bit endpoint to endpoint Internet identifier can be broken into separate components as follows: (1.)1 bit for UDP/TCP protocol selection, (2) two 32 bit IP source and destination t terms that determine selection of the communicating computers, and (3) two 16 bit source and destination UDP/TCP port terms for application/session determination within each computer.

I have discoved that that 90% of the terms in all of the packet identifiers in all of these packets are the same. Based on that discovery, the technique of term sharing has surprising application wherein one memory cell for the redundant terms that would in a conventional CAM consume memory cells, has surprising efficiency.

In the invention, two kinds of identifiers are present—IP addresses and ports. Small "term" CAM's of IP addresses and ports match terms regardless of use as source or destination, or of another session. Another benefit is to "compress" an address or port into fewer bits, since the index of each of the term CAM's is smaller than the term width. Furthermore in the invention, the combination of source/destination address/port matches is matched against yet another small CAM of sessions to in turn locate the index of the session descriptor. As a result, these three small CAMs reduce a 97 bit by 1024 session CAM of 99,328 bits to a fully allocated VxCAM of 61,440 bits.

Limits of the process in accordance with the invention: at least one port per session is required as is at least one address per sets of shared sessions. Hence, in average use the size of the VxCAM of 1024 sessions is greatly reduced—from 61,440 to 23,552 bits. As a result, small memories can be implemented on chip instead of requiring larger off chip memories with their attendant drawbacks, viz., delays, costs, etc.

DESCRIPTION OF EMBODIMENTS

As previously mentioned, content addressable memory (CAM) is a hardware method in which incoming data is compared with a set of predetermined patterns to identify a matching pattern, and has been heretofore used by Internet communications devices to partially decode large (32 to 97 bit) identifiers to direct the packet to its destination. As As the number of sessions increases, the CAM required to compare and match patterns increases linearly (see FIG. 7). Where offchip memory is used to process these patterns, inefficiency results.

Figure 9:
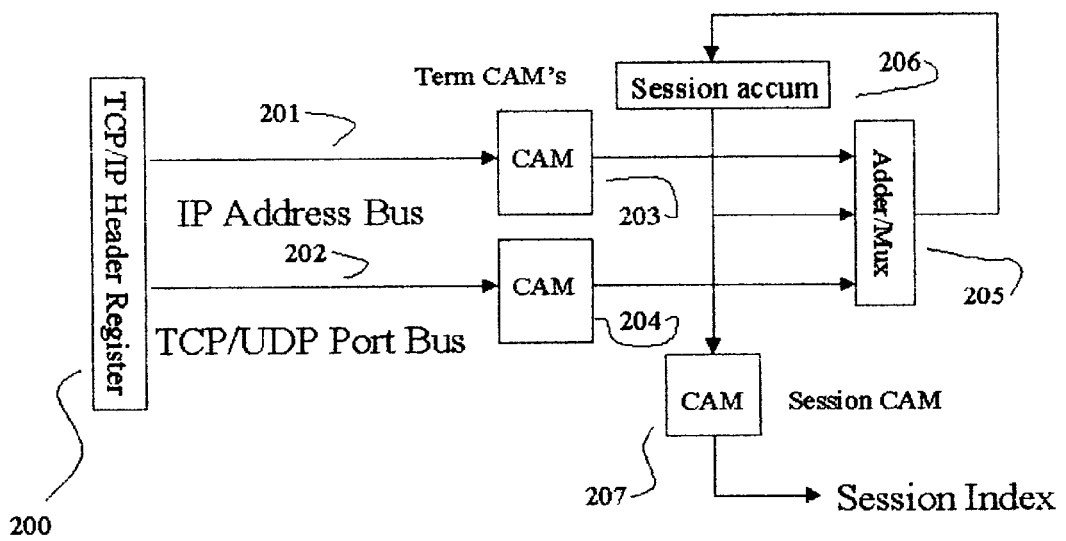

VxCAM (Virtual Extensible Content Addressable Memory) of the invention, matches a minimum number of predetermined plurality of patterns, resulting in fewer memory elements (FIG. 8) required so that the invention is easily implemented on-chip, narrows memory path width, and reduces connection establishment overhead. The method and system of the invention is shown in detail in FIG. 9.

As shown, as the destination address is latched in the TCP/IP header register (200), the Session Accumulator (206) is cleared. The destination address is gated onto the IP address bus (201) to an Address Term CAM (203) which locates the destination address term. If not found, the packet is signaled as not recognized and the VxCAM ignores all further action. However, if found, the resultant index of the IP address term is passed through the Adder/Mux (205) to the Session Accumulator register (206). Similarly, the source address is gated onto the IP address bus to an Address Term CAM (203) which locates the source address term. If not found, the packet is signaled as not recognized and the VxCAM ignores all further action. If found, the resultant index of the IP address term is accumulated using the Adder/Mux (205) to the Session Accumulator register (206). The destination port address is gated onto the TCP/UDP port bus (202) to a Address Term CAM (204) which locates the destination port address term. If not found, the packet is signaled as not recognized and the VxCAM ignores all further action. If found, the resultant index of the port destination address term is accumulated using the Adder/Mux (205) to the Session Accumulator register (206). The source port address, if present, is gated onto the TCP/UDP port bus (202) to an Address Term CAM (204) which locates the source port address term. If found, the resultant index of the port address term is accumulated using the Adder/Mux (205) to the Session Accumulator register (206). The contents of the Session Accumulator consisting of the term index of the IP destination address, the term index of the IP source address, the term index of the TCP/UDP destination port address, and the term index of the TCP/UDP source port address if present, is passed to the Session CAM (207) which locates the index of the session descriptor.

I have discovered that TCP/IP communications involve highly redundant header fields that can be matched more efficiently by factoring out the redundant entries.

While the foregoing descrpition has been with refererence to particular embodiments, it will be appreciated by those skilled in the art that changes in these embodiments made be made without departing from the spirit of the invention, the scipe of which is defined in the appended claims.

What is claimed is:

1. A method of matching a predetermined plurality of patterns of a stream-oriented protocol involving a network communications device, for data packets having a formatted header, the network communications device comprising means for selecting to store an incoming packet in a memory, for headers having identifying network addresses and identifying network application ports, and means for comparing the incoming packet with a plurality of predetermined patterns, whereby the plurality of said packets to be accepted are exclusively determined by said identifying network address and said identifying network application ports, the method comprising the steps of (i) extracting said identifying network addresses and said identifying network application ports from said headers as said incoming packet's terms, (ii) coordinating prior accepted terms found in a series of term content addressable memories from prior received incoming packets, said prior accepted terms being structured into patterns corresponding to classes of transmission, said patterns corresponding to the classes of transmission being the aggregated match of all terms to a specific session, said specific session in a session content addressable memory determining said incoming packets as acceptable, and (iii) storing terms in common or shared from a plurality of accepted packets found in said term content addressable memories, said aggregate match of terms found as matching the structured patterns corresponding to said classes of transmission which are stored in said session content addressable memory, and (iv) implementing programmable hardware logic to identify said classes of transmission with such classes of protocols whereby individual data packets are meaningfully associated with stateful stream protocols, and so that significantly less memory is required reducing power consumption and increasing connection establishment.

2. The method of claim 1 wherein said stream-oriented protocol comprises TCP/IP.

3. The method of claim 1 wherein said classes of transmission affirm any packet as belonging to the said plurality of accepted packets having terms found in said term content addressable memories as valid and in the absence deny packet as belonging to the said plurality, acting to remove invalid packets from the network communications device.

4. The method of claim 1 wherein in step (ii) said classes of transmission decide at least one of the group selected from additional processing, switching, measuring, logging, and routing of said plurality to other network communications devices.

5. A network communications device, for data packets having a formatted header containing information about the packet, for headers having identifying network addresses and identifying network application ports and including a header decoder, term addressable memory, and stateful protocol processing units, said protocol processing units acting to store selected incoming packets, said network communications device comprising a session content addressable memory, programmable logic means whereby the plurality of said packets to be accepted are exclusively determined by said identifying network address and said identifying network application ports, an extracting means by which said identifying network application ports of said incoming packets are obtained from said headers as terms, a coordinating means by which prior accepted terms found in the corresponding term content addressable memory, said term content addressable memory contents being prior accepted terms acquired from prior accepted incoming packets, said prior accepted terms being structured into patterns corresponding to classes of transmission, a matching means by which said patterns corresponding to the classes of transmission being the aggregated match of all terms to a specific session, said specific session in a session content addressable memory having then determined said incoming packets as acceptable, and a learning means by which storing of terms in common or shared from a plurality of accepted packets, from all accepted terms acquired from prior accepted incoming packets, said accepted terms found in said term content addressable memories, said aggregate match of terms found as matching the structured patterns corresponding to said classes of transmission as coordinated by specific session, said specific session in a session content addressable memory having then determined said incoming packets as acceptable, which are stored in said term content addressable memories as valid terms.

6. The network communications device of claim 5 wherein said stream-oriented network protocol units comprises TCP/IP identifying network addresses and identifying network application ports, and programmable logic controlled by a state machine, whereby TCP segments can be identified statefully for processing into memory, thereby allowing higher level stream processing of session data spread across multiple data packets.

* * * * *